(12) United States Patent
Leonard et al.

(10) Patent No.: US 9,147,218 B2
(45) Date of Patent: Sep. 29, 2015

(54) DEVICES FOR FORECASTING RATIOS IN HIERARCHIES

(71) Applicant: SAS Institute Inc., Cary, NC (US)

(72) Inventors: Michael James Leonard, Cary, NC (US); Michele Angelo Trovero, Dunellen, NJ (US); David Bruce Elsheimer, Clayton, NC (US); Peter Dillman, Flemington, NJ (US)

(73) Assignee: SAS Institute Inc., Cary, NC (US)

( * ) Notice: Subject to any disclaimer, the term of this patent is extended or adjusted under 35 U.S.C. 154(b) by 282 days.

(21) Appl. No.: 13/786,838

(22) Filed: Mar. 6, 2013

(65) Prior Publication Data

US 2014/0257778 A1 Sep. 11, 2014

(51) Int. Cl.
*G06Q 40/06* (2012.01)
*G06F 17/00* (2006.01)

(52) U.S. Cl.
CPC ............... *G06Q 40/06* (2013.01); *G06F 17/60* (2013.01)

(58) Field of Classification Search
USPC .......................... 703/2; 702/3; 705/7.11, 7.25
See application file for complete search history.

(56) References Cited

U.S. PATENT DOCUMENTS

| | | | |
|---|---|---|---|
| 5,461,699 A | 10/1995 | Arbabi et al. | |
| 5,615,109 A | 3/1997 | Eder | |
| 5,870,746 A | 2/1999 | Knutson et al. | |
| 5,918,232 A | 6/1999 | Pouschine et al. | |
| 5,926,822 A | 7/1999 | Garman | |
| 5,953,707 A | 9/1999 | Huang et al. | |
| 5,991,740 A | 11/1999 | Messer | |
| 5,995,943 A | 11/1999 | Bull et al. | |
| 6,052,481 A | 4/2000 | Grajski et al. | |
| 6,128,624 A | 10/2000 | Papierniak et al. | |
| 6,151,582 A * | 11/2000 | Huang et al. | 705/7.25 |
| 6,151,584 A | 11/2000 | Papierniak et al. | |
| 6,169,534 B1 | 1/2001 | Raffel et al. | |
| 6,189,029 B1 | 2/2001 | Fuerst | |
| 6,208,975 B1 | 3/2001 | Bull et al. | |
| 6,216,129 B1 | 4/2001 | Eldering | |
| 6,223,173 B1 | 4/2001 | Wakio et al. | |
| 6,230,064 B1 | 5/2001 | Nakase et al. | |
| 6,286,005 B1 | 9/2001 | Cannon | |
| 6,308,162 B1 | 10/2001 | Ouimet et al. | |

(Continued)

FOREIGN PATENT DOCUMENTS

WO 2005/124718 A2 12/2005

OTHER PUBLICATIONS

Yu, Lean et al., "Time Series Forecasting with Multiple Candidate Models: Selecting or Combining?" Journal of System Science and Complexity, vol. 18, No. 1, pp. 1-18 (Jan. 2005).

(Continued)

*Primary Examiner* — Thai Phan
(74) *Attorney, Agent, or Firm* — Kilpatrick Townsend & Stockton LLP

(57) ABSTRACT

Systems and methods for forecasting ratios in hierarchies are provided. Hierarchies can be formed that have components, including a numerator time series with values from input data, a denominator time series with values from input data, and a ratio time series of the numerator time series over the denominator time series. The components can be modeled to generate forecasted hierarchies. The forecasted hierarchies can be reconciled so that the forecasted hierarchies are statistically consistent throughout nodes of the forecasted hierarchies.

51 Claims, 9 Drawing Sheets

(56) References Cited

U.S. PATENT DOCUMENTS

| | | | |
|---|---|---|---|
| 6,317,731 B1 | 11/2001 | Luciano | |
| 6,334,110 B1 | 12/2001 | Walter et al. | |
| 6,356,842 B1 | 3/2002 | Intriligator et al. | |
| 6,397,166 B1 | 5/2002 | Leung et al. | |
| 6,400,853 B1 | 6/2002 | Shiiyama | |
| 6,526,405 B1 | 2/2003 | Mannila et al. | |
| 6,539,392 B1 | 3/2003 | Rebane | |
| 6,542,869 B1 | 4/2003 | Foote | |
| 6,564,190 B1 | 5/2003 | Dubner | |
| 6,570,592 B1 | 5/2003 | Sajdak et al. | |
| 6,591,255 B1 | 7/2003 | Tatum et al. | |
| 6,611,726 B1 | 8/2003 | Crosswhite | |
| 6,640,227 B1 | 10/2003 | Andreev | |
| 6,735,738 B1 | 5/2004 | Kojima | |
| 6,775,646 B1 | 8/2004 | Tufillaro et al. | |
| 6,792,399 B1 | 9/2004 | Phillips et al. | |
| 6,850,871 B1 | 2/2005 | Barford et al. | |
| 6,876,988 B2 | 4/2005 | Helsper et al. | |
| 6,878,891 B1 | 4/2005 | Josten et al. | |
| 6,928,398 B1 | 8/2005 | Fang et al. | |
| 6,978,249 B1 | 12/2005 | Beyer et al. | |
| 7,072,863 B1 | 7/2006 | Phillips et al. | |
| 7,080,026 B2 | 7/2006 | Singh et al. | |
| 7,103,222 B2 | 9/2006 | Peker | |
| 7,130,822 B1 | 10/2006 | Their et al. | |
| 7,171,340 B2 | 1/2007 | Brocklebank | |
| 7,194,434 B2 | 3/2007 | Piccioli | |
| 7,216,088 B1 | 5/2007 | Chappel et al. | |
| 7,222,082 B1 | 5/2007 | Adhikari et al. | |
| 7,236,940 B2 | 6/2007 | Chappel | |
| 7,240,019 B2 | 7/2007 | Delurgio et al. | |
| 7,251,589 B1 | 7/2007 | Crowe et al. | |
| 7,260,550 B1 | 8/2007 | Notani | |
| 7,280,986 B2 | 10/2007 | Goldberg et al. | |
| 7,433,834 B2 | 10/2008 | Joao | |
| 7,523,048 B1 | 4/2009 | Dvorak | |
| 7,530,025 B2 | 5/2009 | Ramarajan et al. | |
| 7,562,062 B2 * | 7/2009 | Ladde et al. | 706/47 |
| 7,565,417 B2 | 7/2009 | Rowady, Jr. | |
| 7,570,262 B2 | 8/2009 | Landau et al. | |
| 7,610,214 B1 | 10/2009 | Dwarakanath et al. | |
| 7,617,167 B2 | 11/2009 | Griffis et al. | |
| 7,660,734 B1 | 2/2010 | Neal et al. | |
| 7,689,456 B2 | 3/2010 | Schroeder et al. | |
| 7,693,737 B2 | 4/2010 | Their et al. | |
| 7,702,482 B2 | 4/2010 | Graepel et al. | |
| 7,711,734 B2 | 5/2010 | Leonard | |
| 7,716,022 B1 | 5/2010 | Park et al. | |
| 7,987,106 B1 * | 7/2011 | Aykin | 705/7.11 |
| 8,005,707 B1 | 8/2011 | Jackson et al. | |
| 8,010,324 B1 | 8/2011 | Crowe et al. | |
| 8,010,404 B1 | 8/2011 | Wu et al. | |
| 8,326,677 B1 | 12/2012 | Fan et al. | |
| 8,631,040 B2 | 1/2014 | Jackson et al. | |
| 2001/0013008 A1 | 8/2001 | Waclawski | |
| 2002/0169657 A1 | 11/2002 | Singh et al. | |
| 2003/0101009 A1 | 5/2003 | Seem | |
| 2003/0105660 A1 | 6/2003 | Walsh et al. | |
| 2003/0110016 A1 | 6/2003 | Stefek et al. | |
| 2003/0154144 A1 | 8/2003 | Pokorny et al. | |
| 2003/0187719 A1 | 10/2003 | Brocklebank | |
| 2003/0200134 A1 | 10/2003 | Leonard et al. | |
| 2003/0212590 A1 | 11/2003 | Klingler | |
| 2004/0041727 A1 | 3/2004 | Ishii et al. | |
| 2004/0172225 A1 | 9/2004 | Hochberg et al. | |
| 2005/0055275 A1 | 3/2005 | Newman et al. | |
| 2005/0102107 A1 | 5/2005 | Porikli | |
| 2005/0114391 A1 | 5/2005 | Corcoran et al. | |
| 2005/0159997 A1 | 7/2005 | John | |
| 2005/0177351 A1 | 8/2005 | Goldberg et al. | |
| 2005/0209732 A1 | 9/2005 | Audimoolam et al. | |
| 2005/0249412 A1 | 11/2005 | Radhakrishnan et al. | |
| 2005/0271156 A1 | 12/2005 | Nakano | |
| 2006/0063156 A1 | 3/2006 | Willman et al. | |
| 2006/0064181 A1 | 3/2006 | Kato | |
| 2006/0085380 A1 | 4/2006 | Cote et al. | |
| 2006/0112028 A1 | 5/2006 | Xiao et al. | |
| 2006/0143081 A1 | 6/2006 | Argaiz | |
| 2006/0164997 A1 | 7/2006 | Graepel et al. | |
| 2006/0241923 A1 | 10/2006 | Xu et al. | |
| 2006/0247859 A1 * | 11/2006 | Ladde et al. | 702/3 |
| 2006/0247900 A1 | 11/2006 | Brocklebank | |
| 2007/0011175 A1 | 1/2007 | Langseth et al. | |
| 2007/0094168 A1 | 4/2007 | Ayala et al. | |
| 2007/0106550 A1 | 5/2007 | Umblijs et al. | |
| 2007/0118491 A1 | 5/2007 | Baum et al. | |
| 2007/0162301 A1 | 7/2007 | Sussman et al. | |
| 2007/0203783 A1 | 8/2007 | Beltramo | |
| 2007/0208492 A1 | 9/2007 | Downs et al. | |
| 2007/0208608 A1 | 9/2007 | Amerasinghe et al. | |
| 2007/0291958 A1 | 12/2007 | Jehan | |
| 2008/0097802 A1 * | 4/2008 | Ladde et al. | 705/7 |
| 2008/0208832 A1 | 8/2008 | Friedlander et al. | |
| 2008/0288537 A1 | 11/2008 | Golovchinsky et al. | |
| 2008/0294651 A1 | 11/2008 | Masuyama et al. | |
| 2009/0018996 A1 | 1/2009 | Hunt et al. | |
| 2009/0172035 A1 | 7/2009 | Lessing et al. | |
| 2009/0319310 A1 | 12/2009 | Little | |
| 2010/0030521 A1 | 2/2010 | Akhrarov et al. | |
| 2010/0063974 A1 | 3/2010 | Papadimitriou et al. | |
| 2010/0114899 A1 | 5/2010 | Guha et al. | |
| 2010/0257133 A1 | 10/2010 | Crowe et al. | |
| 2011/0119374 A1 | 5/2011 | Ruhl et al. | |
| 2011/0145223 A1 | 6/2011 | Cormode et al. | |
| 2011/0208701 A1 | 8/2011 | Jackson et al. | |
| 2011/0307503 A1 | 12/2011 | Dlugosch | |
| 2012/0053989 A1 | 3/2012 | Richard | |
| 2013/0024167 A1 | 1/2013 | Blair et al. | |
| 2013/0024173 A1 | 1/2013 | Brzezicki et al. | |
| 2013/0268318 A1 | 10/2013 | Richard | |
| 2014/0019088 A1 | 1/2014 | Leonard et al. | |
| 2014/0019448 A1 | 1/2014 | Leonard et al. | |
| 2014/0019909 A1 | 1/2014 | Leonard et al. | |

OTHER PUBLICATIONS

Non-Final Office Action of Aug. 30, 2013 for U.S. Appl. No. 10/402,849, 29 pages.

Notice of Allowance of Sep. 16, 2013 for U.S. Appl. No. 13/031,828 17 pages.

Non-Final Office Action of Oct. 25, 2013 for U.S. Appl. No. 13/189,131, 37 pages.

Final Office Action of Apr. 24, 2014 for U.S. Appl. No. 13/189,131, 30 pages.

Aiolfi, Marco et al., "Forecast Combinations," CREATES Research Paper 2010-21, School of Economics and Management, Aarhus University, 35 pp. (May 6, 2010).

Automatic Forecasting Systems Inc., Autobox 5.0 for Windows User's Guide, 82 pp. (1999).

Choudhury, J. Paul et al., "Forecasting of Engineering Manpower Through Fuzzy Associative Memory Neural Network with ARIMA: A Comparative Study", Neurocomputing, vol. 47, Iss. 1-4, pp. 241-257 (Aug. 2002).

Costantini, Mauro et al., "Forecast Combination Based on Multiple Encompassing Tests in a Macroeconomic DSGE System," Reihe Okonomie/ Economics Series 251, 24 pp. (May 2010).

Crowe, Keith E. et al., U.S. Appl. No. 11/431,089, filed May 9, 2006 entitled "Computer-Implemented System and Method for Generating Forecasts".

Crowe, Keith E. et al., U.S. Appl. No. 11/431,123, filed May 9, 2006 entitled "Computer-Implemented Systems and Methods for Storing Data Analysis Models".

Data Mining Group, available at http://www.dmg.org, printed May 9, 2005, 3 pp.

Funnel Web, Web site Analysis. Report, Funnel Web Demonstration, Authenticated Users History, http://www.quest.com/funnel.sub.--web/analyzer/sample/UserHist.html (1 pg.), Mar. 2002.

Funnel Web, Web site Analysis Report, Funnel Web Demonstration, Clients History, http://www/quest.com/funnel.sub.--web/analyzer/sample.ClientHist- .html (2 pp.), Mar. 2002.

(56) References Cited

OTHER PUBLICATIONS

Garavaglia, Susan et al., "A Smart Guide to Dummy Variables: Four Applications and a Macro," accessed from: http://web.archive.org/web/20040728083413/http://www.ats.ucla.edu/stat/sa- s/library/nesug98/p046.pdf, (2004).

Guerard John B. Jr., Automatic Time Series Modeling, Intervention Analysis, and Effective Forecasting. (1989) Journal of Statistical Computation and Simulation, 1563-5163, vol. 34, Issue 1, pp. 43-49.

Guralnik, V. and Srivastava, J., Event Detection from Time Series Data (1999), Proceedings of the 5th ACM SIGKDD International Conference on Knowledge Discovery and Data Mining, pp. 33-42.

Harrison, H.C. et al., "An Intelligent Business Forecasting System", ACM Annual Computer Science Conference, pp. 229-236 (1993).

Harvey, Andrew, "Forecasting with Unobserved Components Time Series Models," Faculty of Economics, University of Cambridge, Prepared for Handbook of Economic Forecasting, pp. 1-89 (Jul. 2004).

Jackson, Wilma S. et al., U.S. Appl. No. 11/431,127, filed May 9, 2006 entitled "Computer-Implemented Systems and Methods for Defining Events".

Jacobsen, Erik et al., "Assigning Confidence to Conditional Branch Predictions", IEEE, Proceedings of the 29th Annual International Symposium on Microarchitecture, 12 pp. (Dec. 2-4, 1996).

Keogh, Eamonn J. et al., "Derivative Dynamic Time Warping", In First SIAM International Conference on Data Mining (SDM'2001), Chicago, USA, pp. 1-11 (2001).

Kobbacy, Khairy A.H., et al., Abstract, "Towards the development of an intelligent inventory management system," Integrated Manufacturing Systems, vol. 10, Issue 6, (1999) 11 pp.

Kumar, Mahesh, "Combining Forecasts Using Clustering", Rutcor Research Report 40-2005, cover page and pp. 1-16 (Dec. 2005).

Leonard, Michael et al., "Mining Transactional and Time Series Data", abstract and presentation, International Symposium of Forecasting, 23 pp. (2003).

Leonard, Michael et al., "Mining Transactional and Time Series Data", abstract, presentation and paper, SUGI, 142 pp. (Apr. 10-13, 2005).

Leonard, Michael James, U.S. Appl. No. 11/696,951, filed Apr. 5, 2007 entitled "Systems and Methods for Mining Transactional and Times Series Data".

Leonard, Michael, "Large-Scale Automatic Forecasting Using Inputs and Calendar Events", abstract and presentation, International Symposium on Forecasting Conference, 56 pp. (Jul. 4-7, 2004).

Leonard, Michael, "Large-Scale Automatic Forecasting Using Inputs and Calendar Events", White Paper, pp. 1-27 (2005).

Leonard, Michael, "Large-Scale Automatic Forecasting: Millions of Forecasts", abstract and presentation, International Symposium of Forecasting, 156 pp. (2002).

Leonard, Michael, "Predictive Modeling Markup Language for Time Series Models", abstract and presentation, International Symposium on Forecasting Conference, 35 pp. (Jul. 4-7, 2004).

Leonard, Michael, "Promotional Analysis and Forecasting for Demand Planning: A Practical Time Series Approach", with exhibits 1 and 2, SAS Institute Inc., Cary, North Carolina, 50 pp. (2000).

Lu, Sheng et al., "A New Algorithm for Linear and Nonlinear ARMA Model Parameter Estimation Using Affine Geometry", IEEE Transactions on Biomedical Engineering, vol. 48, No. 10, pp. 1116-1124 (Oct. 2001).

Malhotra, Manoj K. et al., "Decision making using multiple models", European Journal of Operational Research, 114, pp. 1-14 (1999).

McQuarrie, Allan D.R. et al., "Regression and Time Series Model Selection", World Scientific Publishing Co. Pte. Ltd., 40 pp. (1998).

Oates, Tim et al., "Clustering Time Series with Hidden Markov Models and Dynamic Time Warping", Computer Science Department, LGRC University of Massachusetts, In Proceedings of the IJACI-99, 5 pp. (1999).

Park, Kwan Hee, Abstract "Development and evaluation of a prototype expert system for forecasting models", Mississippi State University, 1990, 1 pg.

Park, Youngjin et al., U.S. Appl. No. 11/431,116, filed May 9, 2006 entitled "Computer-Implemented Systems and Methods for Processing Time Series Data".

Product Brochure, Forecast PRO, 2000, 12 pp.

Quest Software, "Funnel Web Analyzer: Analyzing the Way Visitors Interact with Your Web Site", http://www.quest.com/funnel.sub.--web/analyzer (2 pp.), Mar. 2002.

Safavi, Alex "Choosing the right forecasting software and system." The Journal of Business Forecasting Methods & Systems 19.3 (2000): 6-10. ABI/INFORM Global, ProQuest.

SAS Institute Inc., SAS/ETS User's Guide, Version 8, Cary NC; SAS Institute Inc., (1999) 1543 pages.

Seasonal Dummy Variables, Mar. 2004, http://shazam.econ.ubc.ca/intro/dumseas.htm, Accessed from: http://web.archive.org/web/20040321055948/http://shazam.econ.ubc.ca/intro- /dumseas.htm.

Simoncelli, Eero, "Least Squares Optimization," Center for Neural Science, and Courant Institute of Mathematical Sciences, pp. 1-8 (Mar. 9, 2005).

Tashman, Leonard J. et al., Abstract "Automatic Forecasting Software: A Survey and Evaluation", International Journal of Forecasting, vol. 7, Issue 2, Aug. 1991, 1 pg.

Using Predictor Variables, (1999) SAS OnlineDoc: Version 8, pp. 1325-1349, Accessed from: http://www.okstate.edu/sas/v8/saspdf/ets/chap27.pdf.

van Wijk, Jarke J. et al., "Cluster and Calendar based Visualization of Time Series Data", IEEE Symposium on Information Visualization (INFOVIS '99), San Francisco, pp. 1-6 (Oct. 25-26, 1999).

Vanderplaats, Garret N., "Numerical Optimization Techniques for Engineering Design", Vanderplaats Research & Development (publisher), Third Edition, 18 pp. (1999).

Wang, Liang et al., "An Expert System for Forecasting Model Selection", IEEE, pp. 704-709 (1992).

Weiss, Jack, "Lecture 16—Wednesday, Feb. 8, 2006," http://www.unc.edu/courses/2006spring/ecol/145/001/docs/lectures/lecture16.htm, 9 pp. (Feb. 9, 2006).

Atuk, Oguz et al., "Seasonal Adjustment in Economic Time Series," Statistics Department, Discussion Paper No. 2002/1, Central Bank of the Republic of Turkey, Central Bank Review, 15 pp. (2002).

Babu, G., "Clustering in non-stationary environments using a clan-based evolutionary approach," Biological Cybernetics, Sep. 7, 1995, Springer Berlin I Heidelberg, pp. 367-374, vol. 73, Issue: 4.

Bruno, Giancarlo et al., "The Choice of Time Intervals in Seasonal Adjustment: A Heuristic Approach," Institute for Studies and Economic Analysis, Rome Italy, 14 pp. (2004).

Bruno, Giancarlo et al., "The Choice of Time Intervals in Seasonal Adjustment: Characterization and Tools," Institute for Studies and Economic Analysis, Rome, Italy, 21 pp. (Jul. 2001).

Bradley, D.C. et al., "Quantitation of measurement error with Optimal Segments: basis for adaptive time course smoothing," Am J Physiol Endocrinol Metab Jun. 1, 1993 264:(6) E902-E911.

Huang, N. E. et al., "Applications of Hilbert-Huang transform to non-stationary financial time series analysis." Appl. Stochastic Models Bus. Ind., 19: 245-268 (2003).

IBM, "IBM Systems, IBM Power Executive Installation and User's Guide," Version 2.10, 62 pp. (Aug. 2007).

Kalpakis, K. et al., "Distance measures for effective clustering of ARIMA time-series," Data Mining, 2001. ICDM 2001, Proceedings IEEE International Conference on, vol., No., pp. 273-280, 2001.

Keogh, E. et al., "An online algorithm for segmenting time series," Data Mining, 2001. ICDM 2001, Proceedings IEEE International Conference on , vol., No., pp. 289-296, 2001.

Keogh, Eamonn et al., "Segmenting Time Series: A Survey and Novel Approach," Department of Information and Computer Science, University of California, Irvine, California 92697, 15 pp. (2004).

Palpanas, T. et al., "Online amnesic approximation of streaming time series," Data Engineering, 2004. Proceedings. 20th International Conference on , vol., No., pp. 339-349, Mar. 30-Apr. 2, 2004.

Wang Xiao-Ye; Wang Zheng-Ou; "A structure-adaptive piece-wise linear segments representation for time series," Information Reuse and Integration, 2004. IR I 2004. Proceedings of the 2004 IEEE International Conference on , vol., No., pp. 433-437, Nov. 8-10, 2004.

(56) References Cited

OTHER PUBLICATIONS

Non-Final Office Action of Aug. 29, 2012 for U.S. Appl. No. 13/031,828, 18 pages.
Non-Final Office Action of Oct. 31, 2007 for U.S. Appl. No. 10/402,849, 14 pages.
Final Office Action of May 21, 2008 for U.S. Appl. No. 10/402,849, 19 pages.
Non-Final Office Action of Feb. 20, 2009 for U.S. Appl. No. 10/402,849, 21 pages.
Final Office Action of Jul. 1, 2010 for U.S. Appl. No. 10/402,849, 24 pages.
Non-Final Office Action of Mar. 26, 2014 for U.S. Appl. No. 13/548,282, 40 pages.
Final Office Action of Oct. 24, 2014 for U.S. Appl. No. 13/548,282, 30 pages.
Notice of Allowance of Jan. 14, 2015 for U.S. Appl. No. 13/551,647 8 pages.
Non-Final Office Action of Jan. 16, 2014 for U.S. Appl. No. 13/440,045, 12 pages.
Non-Final Office Action of Aug. 8, 2014 for U.S. Appl. No. 10/402,849, 29 pages.
Notice of Allowance of Aug. 29, 2014 for U.S. Appl. No. 13/440,045, 9 pages.
Notice of Allowance of Mar. 13, 2015 for U.S. Appl. No. 13/548,307, 9 pages.
Non-Final Office Action of May 22, 2015 for U.S. Appl. No. 10/402,849, 32 pages.

\* cited by examiner

DEVICES FOR FORECASTING RATIOS IN HIERARCHIES

TECHNICAL FIELD

The present disclosure generally relates to computer-implemented, processor device-based systems and methods for forecasting ratios formed by a numerator time series and a denominator time series that aggregate to form hierarchies of time series.

BACKGROUND

Organizational decision-making processes can involve forecasting a time series. Systems and methods for forecasting ratio time series and forming hierarchical time series are desirable.

SUMMARY

In accordance with the teachings provided herein, systems and methods for forecasting ratio time series and forming hierarchical time series are provided.

For example, a computer-implemented method can include forming, on a computing device, hierarchies having components that include a numerator time series with values from input data, a denominator time series with values from the input data, and a ratio time series of the numerator time series over the denominator time series. The components are modeled with the computing device to generate forecasted hierarchies. The forecasted hierarchies are reconciled so that the forecasted hierarchies are statistically consistent throughout nodes of the forecasted hierarchies.

In another example, a system is provided that includes a server device. The server device includes a processor and a non-transitory computer readable storage medium containing instructions that when executed on the processor cause the processor to perform operations. The operations include forming hierarchies having components that include a numerator time series with values from input data, a denominator time series with values from the input data, and a ratio time series of the numerator time series over the denominator time series. The operations also include modeling the components to generate forecasted hierarchies and reconciling the forecasted hierarchies so that the forecasted hierarchies are statistically consistent throughout nodes of the forecasted hierarchies.

In another example, a computer-program product tangibly embodied in a non-transitory machine-readable storage medium is provided that includes instructions that can cause a data processing apparatus to form hierarchies having components that include a numerator time series with values from input data, a denominator time series with values from the input data, and a ratio time series of the numerator time series over the denominator time series. The components are modeled to generate forecasted hierarchies. The forecasted hierarchies are reconciled so that the forecasted hierarchies are statistically consistent throughout nodes of the forecasted hierarchies.

The details of one or more embodiments are set forth in the accompanying drawings and the description below. Other features and aspects will become apparent from the description, the drawings, and the claims.

BRIEF DESCRIPTION OF THE DRAWINGS

Like reference numbers and designations in the various drawings indicate like elements.

DETAILED DESCRIPTION

Certain aspects include systems and methods for forecasting ratios formed by numerator time series and denominator time series that can aggregate to form hierarchical time series. Server device-based time series model selection techniques can be used to forecast ratios of time series organized in a hierarchical fashion. The forecasted ratios can be reconciled to achieve consistent reconciliation of the forecast ratios throughout the hierarchy. A hierarchy of these forecasts can be based on either a pre-determined natural stratification or a business-driven segmentation.

In some aspects, hierarchies can be formed that have components including a numerator time series with values from input data, a denominator time series with values from input data, and a ratio time series of the numerator time series over the denominator time series. The components at each node can be modeled and then reconciled so that the forecasted hierarchies are statistically consistent throughout nodes of the hierarchies.

Organizations can use forecasted ratios in a hierarchical context in decision-making processes. The historical time series related to numerator and denominator can be aggregated with other related time series to form hierarchical time series. The ratio time series can also form a hierarchical time series. A hierarchy of these forecasts can be based on either a pre-determined natural stratification or a business-driven segmentation.

For example, given the claim amount (i.e., severity) and the number of claims (i.e., counts) associated with loss and average loss for insurance loss as computed by the ratio of severity and counts, forecasted ratios can provide forecasts for the average loss (i.e., severity over counts). Claims can be organized by policies, geographic region, demographics, etc.

Another example is insurance costs. Given the total costs related to an insurance policy (i.e., costs) and the number of policy holders (i.e., counts), forecasted ratios can provide forecasts of the cost per member per month. Costs can be organized by policies, geographic region, demographics, etc.

Another example is manufacturing warranties. Given the total claims (i.e., failures) and the number of units sold (i.e., counts) for manufacturing warranty claims, forecasted ratios can provide forecasts of the incremental failure rate (i.e., failures over counts). Failures can be organized by product line, type of warranty, factory, etc.

Another example is in a banking context. Forecasted ratios can provide the average balance given the total credit card balances (i.e., exposure) and the number of cardholders (i.e., counts). Balances for banking purposes can be organized by credit score, type of credit card, or another attribute.

Figure 1:
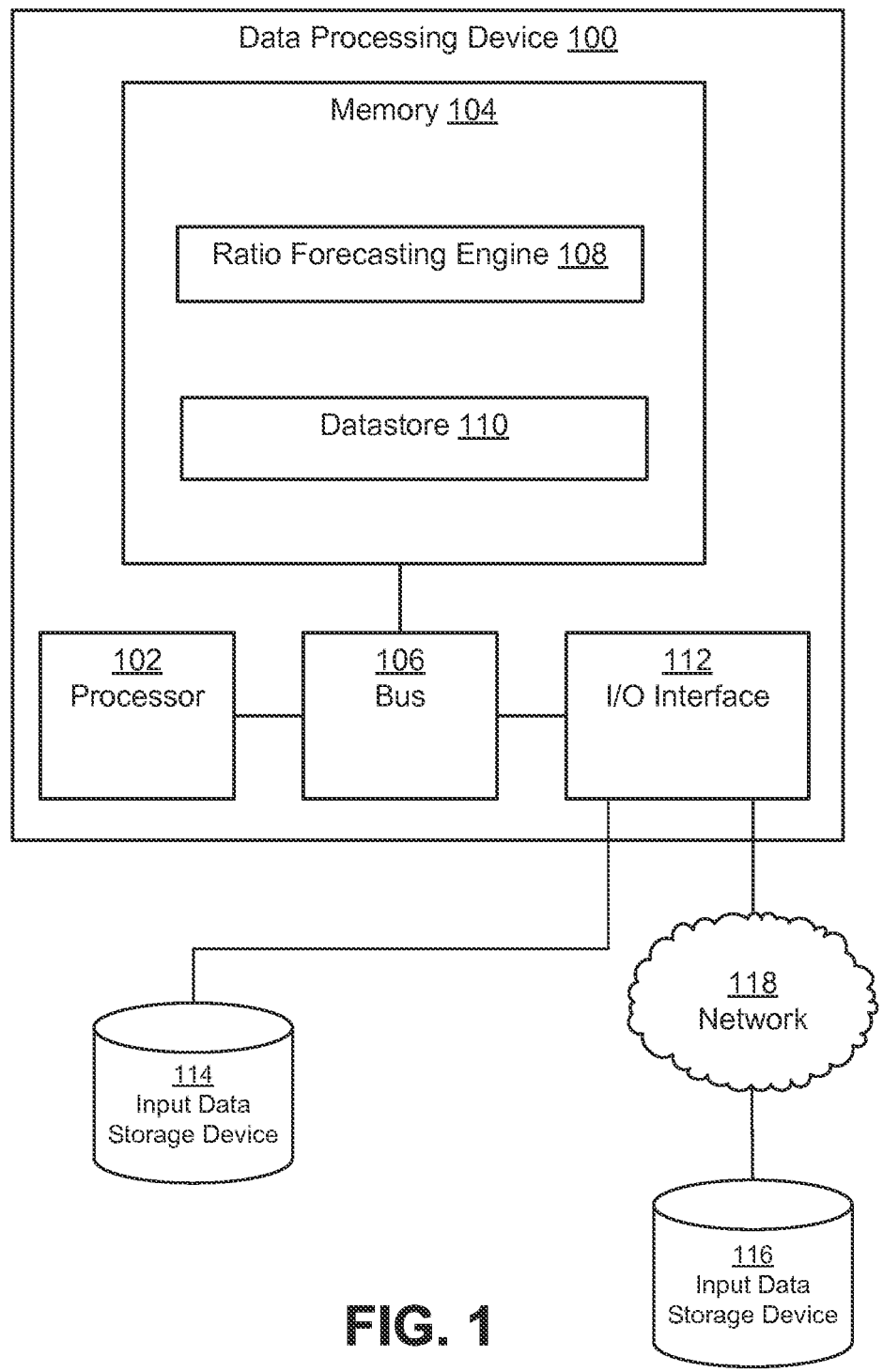
FIG. 1 shows an example of an environment that includes a data processing device that can communicate with other devices using a network.

FIG. 1 is an example of an environment in which certain aspects may be implemented using a data processing device 100. The data processing device 100 includes a processor 102 that can execute code stored on a tangible computer-readable medium in a memory 104 to cause the data processing device 100 to perform actions. The data processing device 100 may be any device that can process data and execute code that is a set of instructions to perform actions. Examples of the data processing device 100 include a database server, a web server, desktop personal computer, a laptop personal computer, a server device, a handheld computing device, and a mobile device.

Examples of the processor 102 include a microprocessor, an application-specific integrated circuit (ASIC), a state machine, or other suitable processor. The processor 102 may include one processor or any number of processors. The processor 102 can access code stored in the memory 104 via a bus 106. The memory 104 may be any non-transitory computer-readable medium configured for tangibly embodying code and can include electronic, magnetic, or optical devices. Examples of the memory 104 include random access memory (RAM), read-only memory (ROM), a floppy disk, compact disc, digital video device, magnetic disk, an ASIC, a configured processor, or other storage device.

Instructions can be stored in the memory 104 as executable code. The instructions can include processor-specific instructions generated by a compiler and/or an interpreter from code written in any suitable computer-programming language. The instructions can include an application, such as ratio forecasting engine 108, that, when executed by the processor 102, can cause the data processing device 100 to form hierarchies including ratio time series, forecast the hierarchies, and reconcile the hierarchies. Memory 104 includes a datastore 110 in which the forecasted hierarchies and reconciled hierarchies can be stored.

The data processing device 100 includes an input/output (I/O) interface 112 through which the data processing device 100 can communicate with devices and systems external to the data processing device 100. For example, the data processing device 100 can receive input data through I/O interface 112 from sources, such as an input data storage device 114 connected to the data processing device 100 or an input data storage device 116 through a network 118 connected to the data processing device 100. Input data may be any type of data usable for forming a numerator time series and/or a denominator time series. Network 118 may be any suitable network. Examples of network 118 include a wide area network (WAN), a local area network (LAN), a wireless local area network (WLAN), and a combination of these and/or other types of networks.

Figure 2:
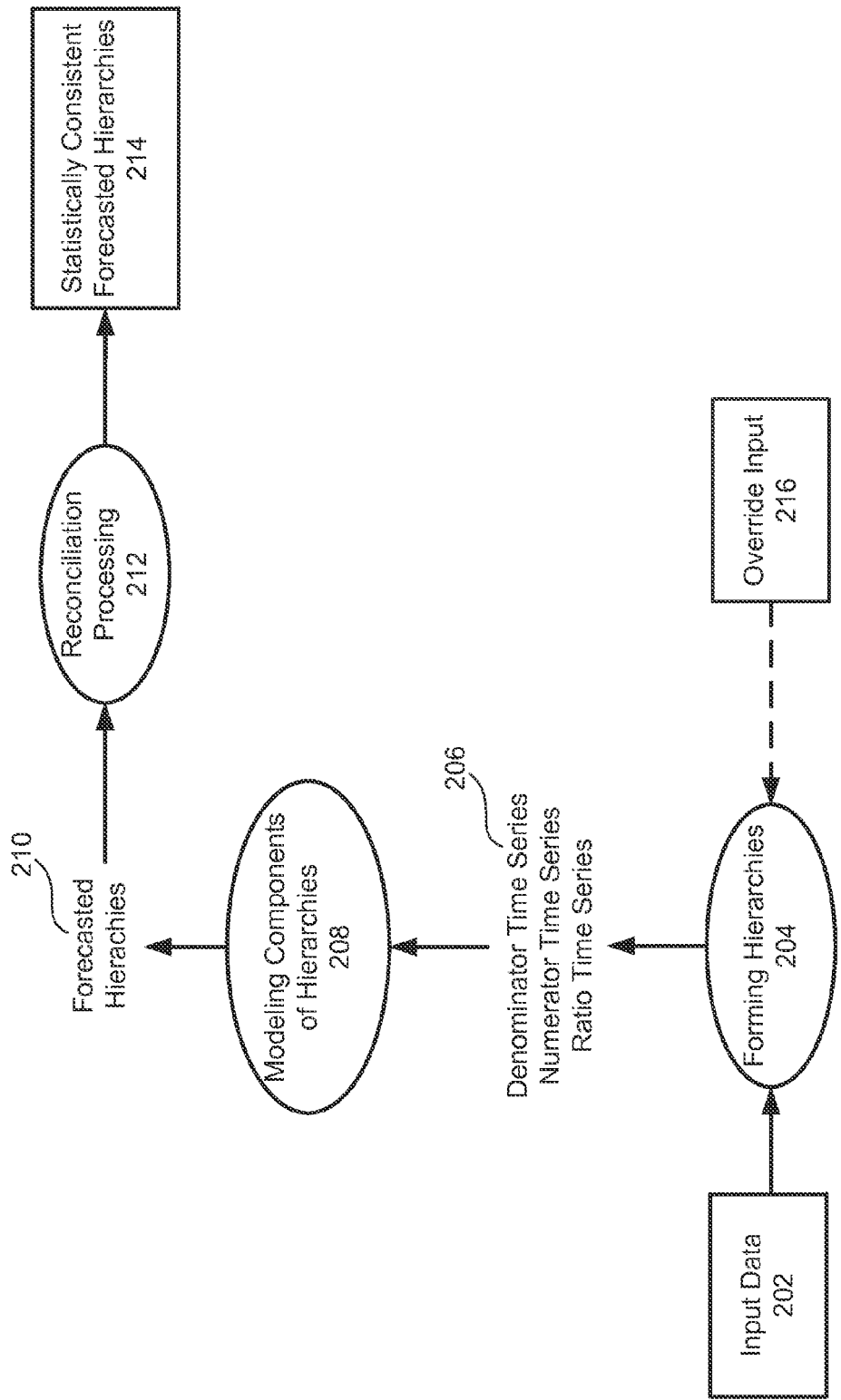
FIG. 2 shows an example of a data flow diagram that includes processes for forecasting ratios.

FIG. 2 is a data flow diagram that depicts an example of certain processes that can be performed by the data processing device 100 of FIG. 1.

As shown in FIG. 2, the data processing device 100 uses input data 202 in a process 204 of forming hierarchies. Input data 202 can include data sets, such as data sets that include time series for certain data types, or otherwise data that the data processing device 100 organizes into time series. The hierarchies include components 206, such as denominator time series, numerator time series, and ratio time series formed by the data processing device 100 executing the ratio forecasting engine 108. In some aspects, the numerator time series is aggregated, the denominator time series is aggregated, and an aggregated ratio time series is generated in forming the hierarchies.

The data processing device 100 performs a process 208 of modeling the components 206 of the hierarchies to generate forecasted hierarchies 210. The components 206 can be modeled independent or jointly, such as modeling the numerator time series and the denominator time series jointly at a node of the hierarchies. The model for a node can include predictor variables that may be different for the numerator series, the denominator series or the ratio series, or may differ across nodes. The components 206 can be modeled using various methodologies, including a direct process, an indirect process, and an adjusted process, applied to individual or aggregated time series. In a direct process, a ratio model prediction can be used to predict a ratio time series forecast directly. In an indirect process, the ratio time series forecast can be determined based on a numerator time series forecast and a denominator time series forecast. In some aspects, confidence bands are derived for the forecasted hierarchies using a transformation or simulation in the indirect process. In an adjusted process, the numerator time series can be pre-adjusted by dividing the numerator time series by the denominator time series appended with denominator time series future predictions, the pre-adjusted numerator time series can be modeled to generate adjusted predictions, and the adjusted predictions can be post-adjusted by multiplying the adjusted predictions by the denominator time series appended with denominator time series future predictions.

The data processing device 100 performs a process 212 of reconciliation processing on the forecasted hierarchies 210 to provide statistically consistent forecasted hierarchies 214 that may be used for decision-making purposes. Reconciliation processing can include reconciling the probability distribution, including the mean of the prediction distribution, the prediction standard errors or variances, and upper and lower confidence bands. Forecasted hierarchies 210 can be reconciled using various methodologies, including a direct reconciliation process, an indirect reconciliation process, and an adjusted reconciliation process. A direct reconciliation process can include using a weight associated with each of the components in reconciling the forecasted hierarchies. The weight may be a time-varying weight and may be determined using reconciled forecasts for the denominator time series and reconciled forecasts for aggregate denominator time series. An indirect reconciliation process can include determining reconciled ratio forecasts using reconciled forecasts for the numerator time series and reconciled forecasts for the denominator time series. An adjusted reconciliation process can include determining reconciled ratio forecasts using reconciled forecasts for the numerator time series appended to actual values and reconciled forecasts for the denominator time series appended to actual values.

In some aspects, an override input 216 can be received by the data processing device 100. The override input 216 may indicate a change through a hierarchy, such as a change to a numerator time series, a denominator time series, and/or a ratio time series. For example, business personnel may apply judgmental inputs for information not captured in historical input data. In response to the override input 216, the data processing device 100 can model the components, including the change, to generate re-forecasted hierarchies, and can re-reconcile the re-forecasted hierarchies to generate statistically consistent forecasted hierarchies 214 including the change.

Figure 3:
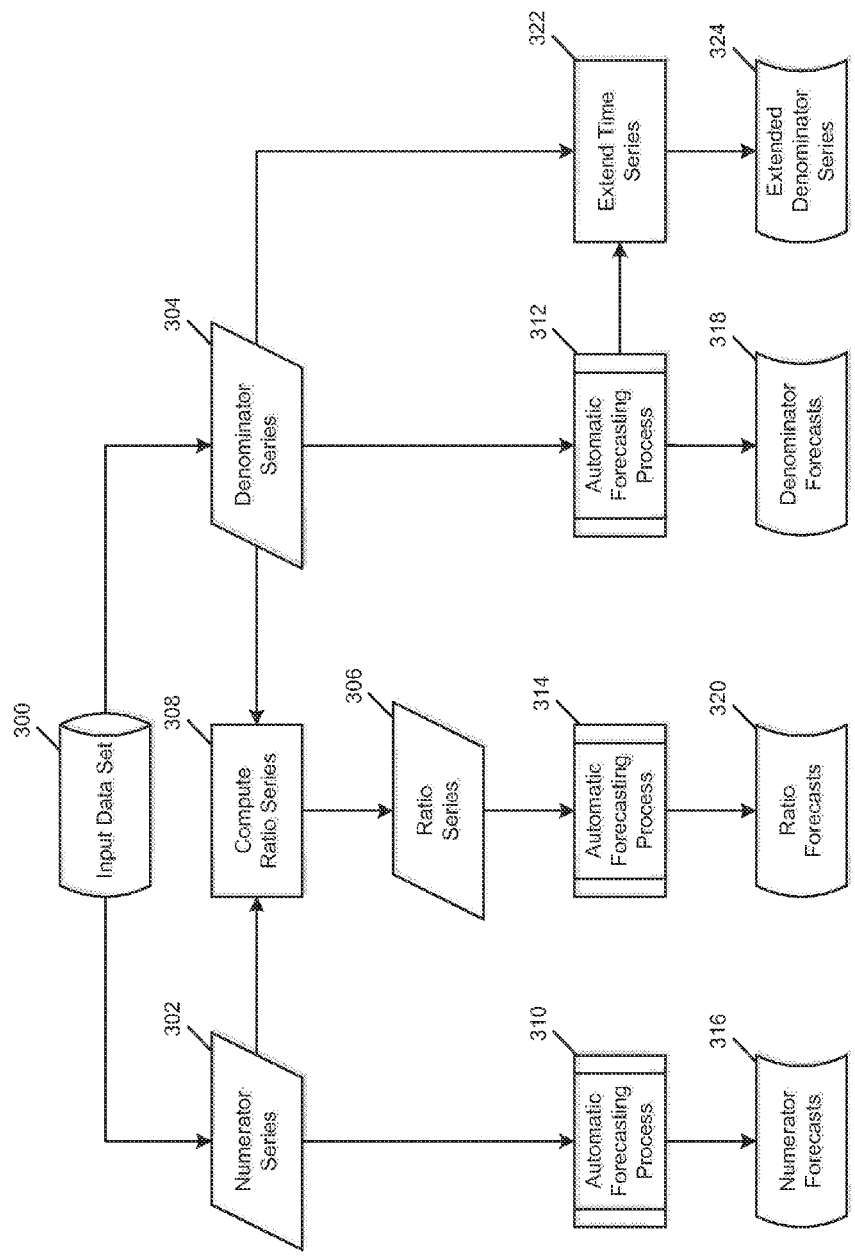
FIG. 3 shows an example of a data flow diagram that includes processes for forecasting components of hierarchies.

FIG. 3 is a data flow diagram depicting an example of forecasting components of hierarchies.

An input data set 300 can be used to form a numerator time series 302 and a denominator time series 304. For example, numerator time series values can be represented by $y_{i,t}$, where t∈{$t_i^b, \ldots, t_i^e$} is the time index for the $i^{th}$ dependent series and where i=1, ... N. The aggregate of the individual numerator time series can be represented by $$Y_t = \sum_{i=1}^{N} y_{i,t}.$$

In the aggregation, missing values can be ignored. Denominator time series values can be represented by $x_{i,t}$, where t∈{$t_i^b, \ldots, t_i^e$} is the time index for the $i^{th}$ dependent series and where i=1, ... N. The aggregate of the individual denominator time series can be represented by $$X_t = \sum_{i=1}^{N} x_{i,t}.$$

In the aggregation, missing values can be ignored.

N can represent the number of series recorded in the time series data set and i=1, ..., N can represent the series index. T can represent the length of the series and t=1, ..., T can represent the time index. The time index can be an ordered set of contiguous integers representing time periods associated with equally spaced time intervals. In some aspects, the beginning and/or ending time index coincide. In other aspects, the beginning and/or ending time index do not coincide. The relationship, t∈{$t_i^b,(t_i^b+1), \ldots, (t_i^e-1),t_i^e$}, can represent the time index, where $t_i^b$ and $t_i^e$ represent the beginning and ending time index for the $i^{th}$ series, respectively.

The ratio time series 306 can be computed 308 using the numerator time series 302 and the denominator time series 304. For example, ratio time series values may be the numerator time series values over the denominator time series values and can be represented by $z_{i,t}=y_{i,t}/x_{i,t}$, where t∈{$t_i^b, \ldots t_i^e$} is the time index for the $i^{th}$ dependent series, and i=1, ... N. When $x_{i,t}=0$, then $z_{i,t}$ can be set to missing. $Z_t=Y_t/X_t$ represents the ratio of aggregates of the numerator time series and the denominator time series. Although possible, $$Z_t \neq \sum_{i=1}^{N} z_{i,t},$$

typically. That is, the ratio time series may not be able to be aggregated in the usual way. The ratio time series can represent average values or percentages.

The numerator time series, the denominator time series, and the ratio time series can have individual (i.e., disaggregate) and aggregate forms. Although processes applied to a two-level hierarchy are described, multilevel hierarchies can be formed by continuing to aggregate the aggregates and processes can be applied to multilevel hierarchies.

Each of the numerator time series 302, denominator time series 304, and ratio time series 306 can be applied to automatic forecasting processes 310, 312, 314 to generate numerator forecasts 316, denominator forecasts 318, and ratio forecasts 320, respectively. The automatic forecasting processes 310, 312, 314 can involve modeling using one or more techniques, such as direct, indirect, and/or adjusted processes. The numerator time series 302 and denominator time series 304 may be modeled and forecast independently or jointly using vector time series forecasting techniques. The models can include predictor variables. In some aspects, an extend time series process 322 can be applied to the denominator time series 304 to generate an extended denominator series 324 that can be used for modeling or reconciliation. A time series model can be used to forecast each component series. $\hat{x}_{i,t}$, $\hat{y}_{i,t}$, and $\hat{z}_{i,t}$ represent the model forecasts for the denominator time series 304, numerator time series 302, and ratio time series 306, respectively. Typically, $\hat{z}_{i,t} \neq \hat{y}_{i,t}/\hat{x}_{i,t}$ except on occasion. $\check{x}_{i,t}$, $\check{y}_{i,t}$, and $\check{z}_{i,t}$ represent the denominator time series 304, numerator time series 302, and ratio time series 306, respectively, appended with future predictions (i.e., extended series). Typically, $\check{z}_{i,t} \neq \check{y}_{i,t}/\check{x}_{i,t}$ except on occasion.

Figure 4:
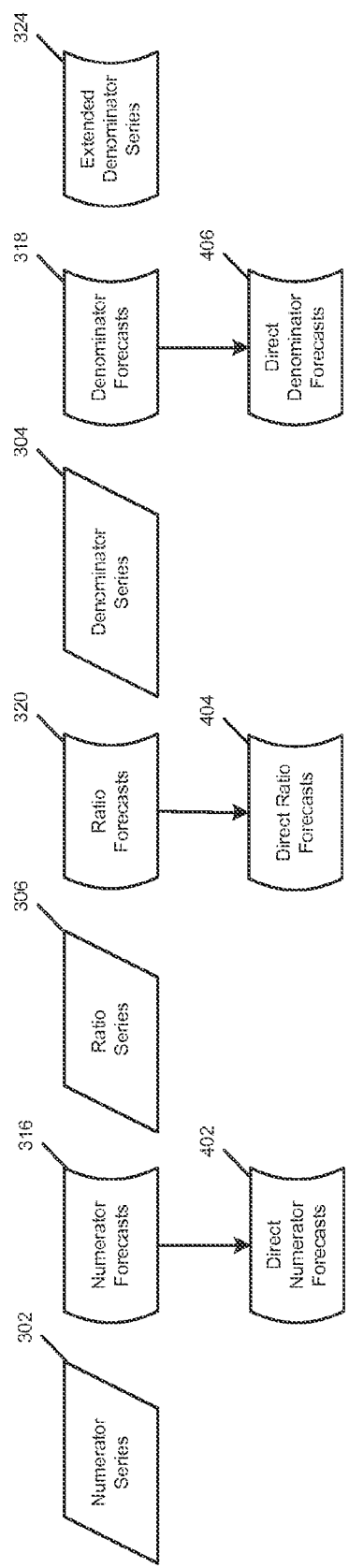
FIG. 4 shows an example of a data flow diagram that includes model forecasting using a direct process.

FIG. 4 is a data flow diagram depicting an example of model forecasting using a direct process. Included in FIG. 4 are the numerator time series 302, the numerator forecasts 316, the ratio time series 306, the ratio forecasts 320, denominator time series 304, denominator forecasts 318, and extended denominator series 324. The forecasts, which may be model predictions, can be used directly to predict the forecasts. For example, the numerator forecasts 316 can be considered direct numerator forecasts 402, the ratio forecasts 320 can be considered direct ratio forecasts 404, and the denominator forecasts 318 can be considered direct denominator forecasts 406. The direct ratio forecasts 404, which may be individual or aggregate, can be determined without considering the numerator time series 302 or the denominator time series 304. Confidence bands can be provided directly.

Figure 5:
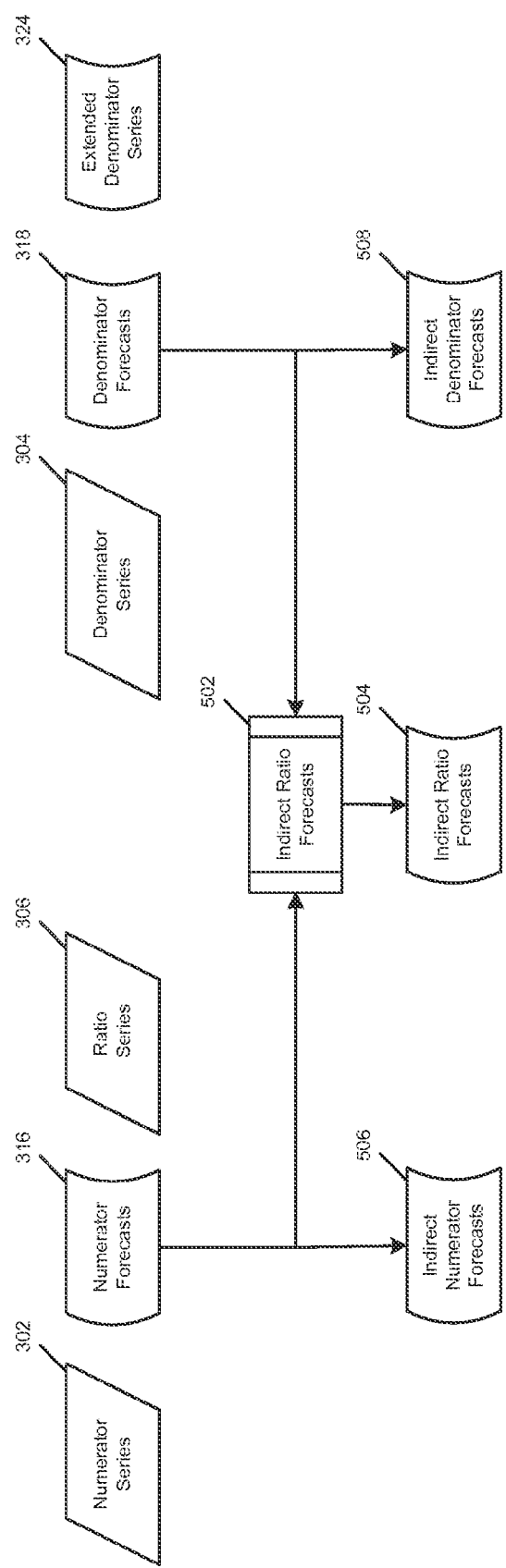
FIG. 5 shows an example of a data flow diagram that includes model forecasting using an indirect process.

FIG. 5 is a data flow diagram depicting an example of model forecasting using an indirect process. Included in FIG. 5 are the numerator time series 302, the numerator forecasts 316, the ratio time series 306, the denominator time series 304, the denominator forecasts 318, and the extended denominator series 324. In an indirect process, the ratio forecast can be modeled based on the numerator forecasts 316 and denominator forecasts 318, rather than directly. The numerator forecasts 316 and the denominator forecasts 318 can be used in indirect ratio forecasts process 502 to produce indirect ratio forecasts 504. In some aspects, the indirect ratio forecasts 504 can be determined by the numerator forecasts 316 over the denominator forecasts 318. For example, $$\hat{z}_{i,t}^I = \frac{\hat{y}_{i,t}}{\hat{x}_{i,t}}$$

can represent the indirect ratio forecasts 504. The indirect numerator forecasts 506 can be determined directly from the numerator forecasts 316 and the indirect denominator forecasts 508 can be determined directly from the denominator forecasts 318. The indirect ratio forecasts 504, the indirect numerator forecasts 506, and the indirect denominator forecasts 508 may be individual or aggregate.

Confidence bands for the indirect process can be determined using Geary-Hinkley transformation or Monte Carlo or other type of simulations. For example, $\hat{\sigma}_{y_{i,t}}$ and $\vec{\sigma}_{x_{i,t}}$ can indicate the prediction standard errors of $\hat{y}_{i,t}$ and $\hat{x}_{i,t}$, respectively, and $\hat{\rho}_{i,t}$ can represent the contemporaneous correlation of $\hat{y}_{i,t}$ and $\hat{x}_{i,t}$, assuming that the distribution of $\hat{y}_{i,t}$ and $\hat{x}_{i,t}$ is Gaussian. $\hat{l}_{i,t,\alpha}^z$ and $\hat{u}_{i,t,\alpha}^z$ can indicate, respectively, the lower and upper confidence limits of level α for $\hat{z}_{i,t}$. If $\hat{x}_{i,t}$ is unlikely to be negative, the Geary-Hinkley transformation can be used to find the approximate prediction bands for $\hat{z}_{i,t}$. For example:

$$s_{i,t} = g_{i,t}(z) = \frac{\hat{x}_{i,t}z - \hat{y}_{i,t}}{\sqrt{\hat{\sigma}_{x_{i,t}}^2 z^2 - 2\hat{\rho}_{i,t}\hat{\sigma}_{x_{i,t}}\hat{\sigma}_{y_{i,t}} + \hat{\sigma}_{y_{i,t}}^2}}$$

The variable $s_{i,t}$ can be approximately distributed according to a standard normal distribution. $l_\alpha^N$ and $u_\alpha^N$ can be, respectively, the lower and upper confidence limits of level $\alpha$ for a standard normal distribution. Then, $$\hat{l}_{i,t,\alpha}^z \approx g_{i,t}^{-1}(l_\alpha^N)$$
$$\hat{u}_{i,t,\alpha}^z \approx g_{i,t}^{-1}(u_\alpha^N)$$

Monte Carlo simulations can be used to find empirical confidence bands for $\hat{z}_{i,t}$. For each fixed time t and series index i, an arbitrarily large value M can be selected and M sets $$[\tilde{x}_{i,t,j}\ \tilde{y}_{i,t,j}],$$
$$j = 1, \ldots, M$$

can be drawn from a multivariate normal distribution with mean $[\hat{x}_{i,t}\ \hat{y}_{i,t}]$ and covariance matrix $$\hat{\Sigma}_{it} = \begin{bmatrix} \hat{\sigma}_{x_{i,t}}^2 & \hat{\rho}_{i,t} \\ \hat{\rho}_{i,t} & \hat{\sigma}_{y_{i,t}}^2 \end{bmatrix}$$

The following relationship can be defined:

$$\tilde{z}_{i,t,j} := \frac{\tilde{y}_{i,t,j}}{\tilde{x}_{i,t,j}},$$

$j=1, \ldots, M$. $\hat{l}_{i,t,\alpha}$ and $\hat{u}_{i,t,\alpha}$ can be taken to be, respectively, the $\alpha$ and $(1-\alpha)$ empirical quantiles of $\tilde{z}_{i,t,j}, j=1, \ldots, M$.

Figure 6:
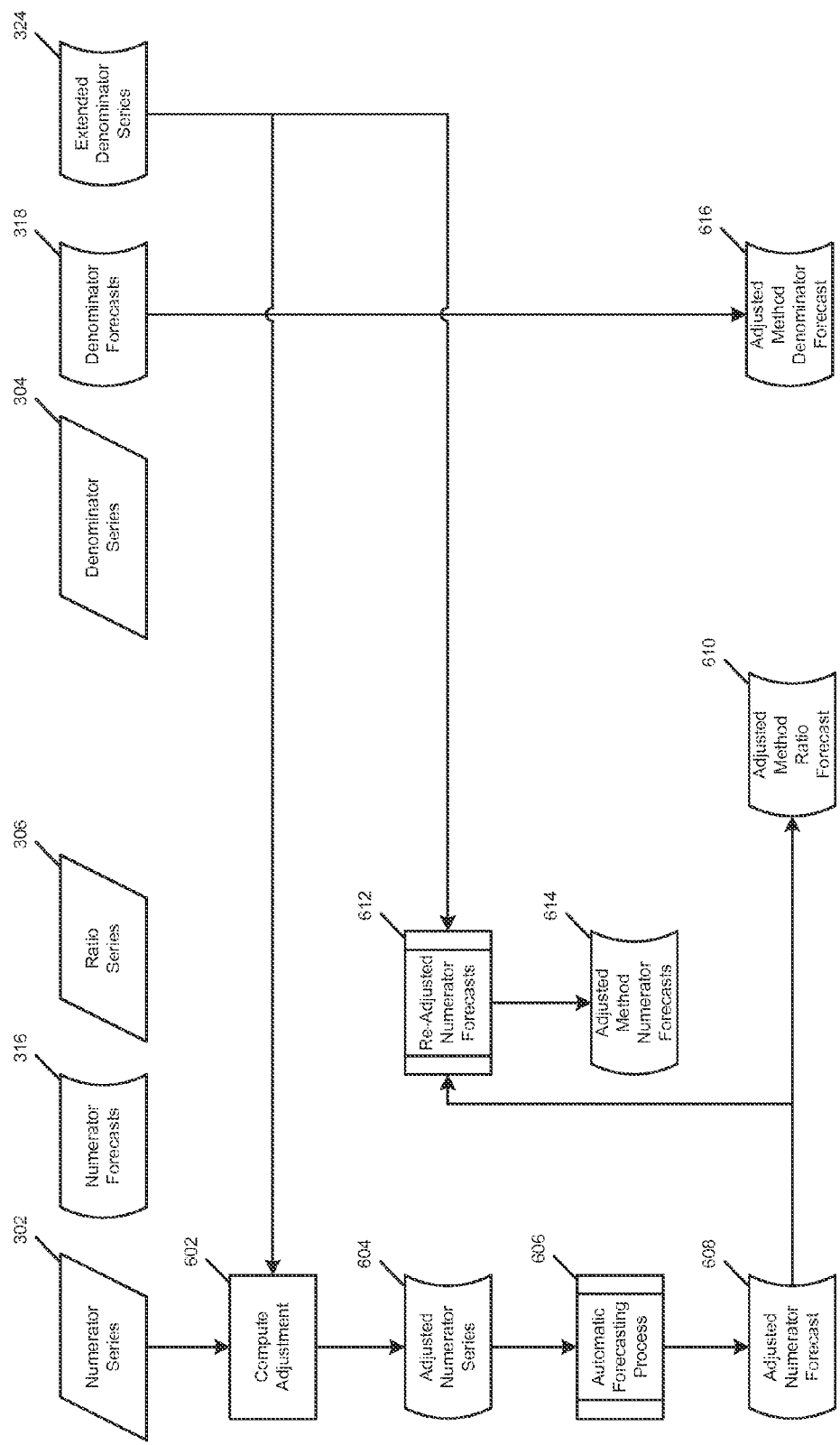
FIG. 6 shows an example of a data flow diagram that includes model forecasting using an adjusted process.

FIG. 6 is a data flow diagram depicting an example of model forecasting using an adjusted process. Included in FIG. 6 are the numerator time series 302, the numerator forecasts 316, the ratio time series 306, the denominator time series 304, the denominator forecasts 318, and the extended denominator series 324. In an adjusted process, the numerator time series 302 can be pre-adjusted in block 602 by the extended denominator series 324 to produce an adjusted numerator series 604. The computation in block 602 can be represented by $y_{i,t}^A = y_{i,t}/\check{x}_{i,t}$. An automatic forecasting process 606 can be applied to the adjusted numerator series 604 to produce an adjusted numerator forecast 608, which may be adjusted predictions represented by $\hat{y}_{i,t}^A$ and can be considered adjusted method ratio forecast 610. The adjusted numerator forecast 608 can be post-adjusted in a re-adjusted numerator forecasts process 612 using the extended denominator series 324 according to the following relationship, $\check{y}_{i,t}^A = \hat{y}_{i,t}^A \check{x}_{i,t}$, to produce adjusted method numerator forecasts 614. An adjusted method denominator forecast 616 can be determined directly from denominator forecasts 318.

Direct, indirect, and adjusted processes may be used with forecast model combination (i.e., ensemble) techniques.

Figure 7:
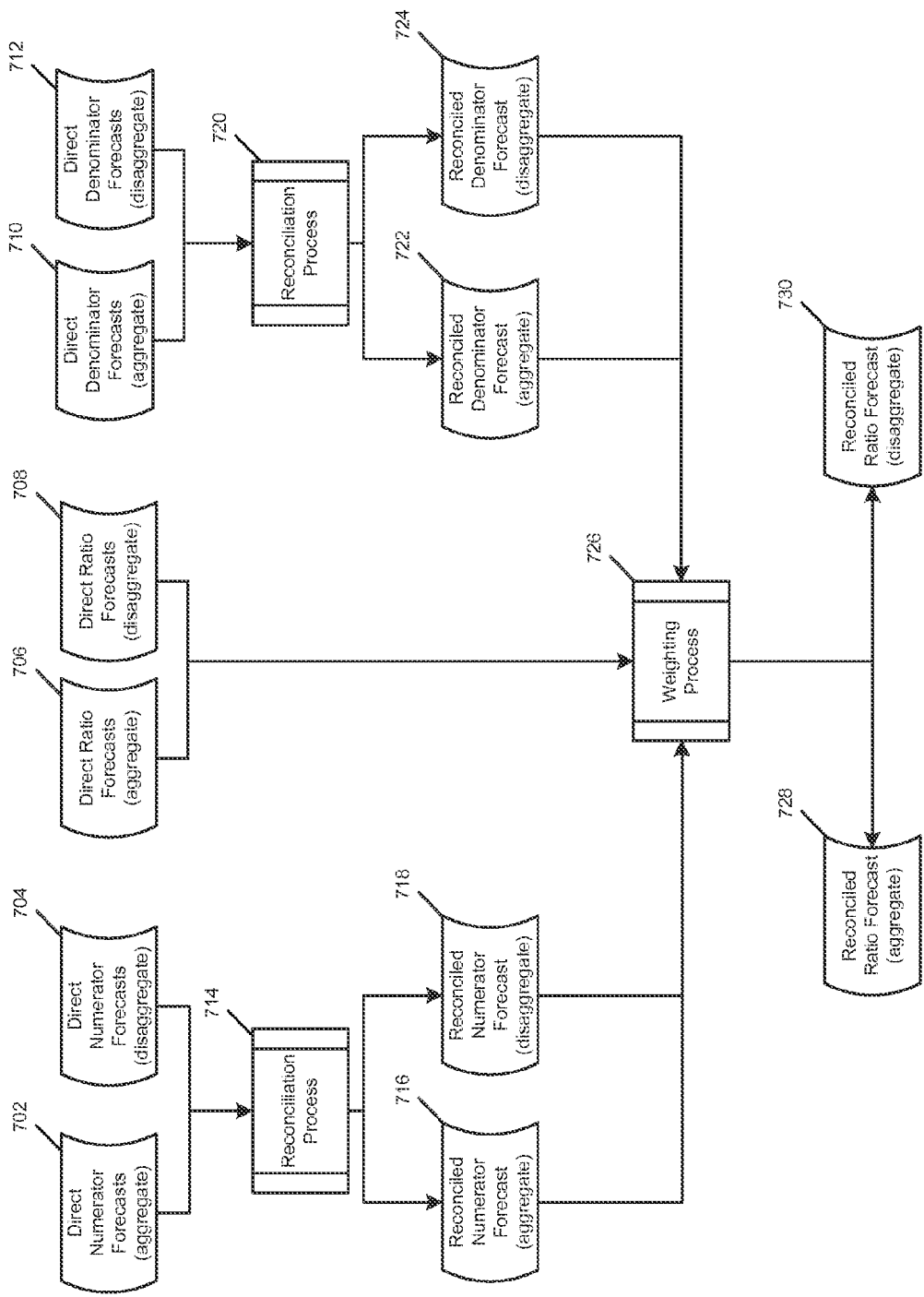
FIG. 7 shows an example of a data flow diagram that includes reconciliation using a direct process.

FIG. 7 is a data flow diagram depicting an example of reconciliation using a direct process. Included in FIG. 7 are direct numerator forecasts (aggregate) 702, direct numerator forecasts (disaggregate) 704, direct ratio forecasts (aggregate) 706, direct ratio forecasts (disaggregate) 708, direct denominator forecasts (aggregate) 710, and direct denominator forecasts (disaggregate) 712. Although both aggregate and disaggregate versions of component forecasts are shown, the direct process for reconciliation can be applied to one, but not both, of the aggregate or disaggregate versions of each of the component forecasts.

A reconciliation process 714 can be applied to the direct numerator forecasts (aggregate) 702 to produce a reconciled numerator forecast (aggregate) 716. The reconciliation process 714 can be applied to the direct numerator forecasts (disaggregate) 704 to produce reconciled numerator forecast (disaggregate) 718. A reconciliation process 720 can be applied to the direct denominator forecasts (aggregate) 710 to produce a reconciled denominator forecast (aggregate) 722. The reconciliation process 720 can be applied to the direct denominator forecasts (disaggregate) 712 to produce reconciled denominator forecast (disaggregate) 724.

Ratio forecasts can be reconciled in a weighting process 726 using forms of weighting and reconciled numerator and reconciled denominator forecasts to generate reconciled ratio forecast (aggregate) 728 and/or reconciled ratio forecast (disaggregate) 730. $w_i$ can represent the weight associated with each series. The weight can be fixed across time. Reconciliation of the ratio forecasts can be performed using one or more of the following relationships:

$$\hat{Z}_t^R = \sum_{i=1}^N w_i \hat{z}_{i,t}$$

(bottom-up) or $$\hat{Z}_t = \sum_{i=1}^N w_i \hat{z}_{i,t}^R$$

(top-down).

Time-varying weights can be used in the weighting process 726 in some aspects. $w_{i,t}$ can represent the weight associated with each series and a particular time. The weighting can be varying over time. Reconciliation of the ratios can be performed using one or more of the following relationships:

$$\hat{Z}_t^R = \sum_{i=1}^N w_{i,t} \hat{z}_{i,t}$$

(bottom-up) or $$\hat{Z}_t = \sum_{i=1}^N w_{i,t} \hat{z}_{i,t}^R$$

(top-down). The weights can be changing over time (e.g., if the series lengths differ) and the future weights may also be needed for aggregation. The future weights can be predicted. $\check{x}_{i,t}$ can represent the reconciled forecasts for the denominator time series appended to the actual values. $\check{X}_t^R$ can represent the reconciled forecasts for the aggregate denominator time series appended to the actual values. The weights can be determined using one or more of the following relationships:

$$\text{Bottom-Up Weights: } \omega_{i,t} = \breve{x}_{i,t} / \breve{X}_{i,t}^R$$

$$\text{Top-Down Weights: } = (\hat{Z}_t \bar{x}_{i,t}^R) / \left( \bar{X}_{i,t} \sum_{i=1}^N \hat{z}_{i,t} \right)$$

Two forecasts may be needed to reconcile ratio forecasts at higher levels of aggregation.

Figure 8:
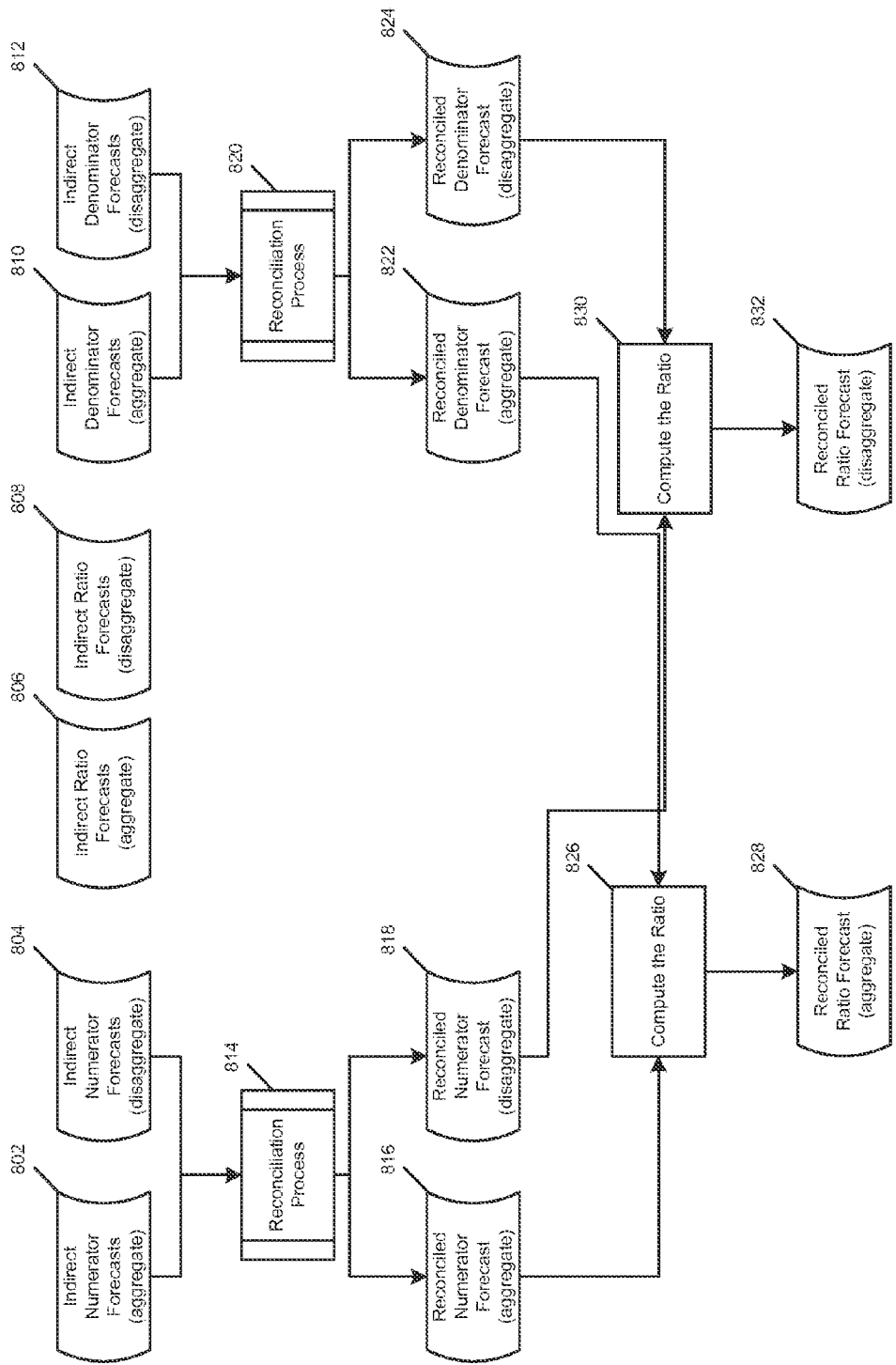
FIG. 8 shows an example of a data flow diagram that includes reconciliation using an indirect process.

FIG. 8 is a data flow diagram depicting an example of reconciliation using an indirect process. Included in FIG. 8 are indirect numerator forecasts (aggregate) 802, indirect numerator forecasts (disaggregate) 804, indirect ratio forecasts (aggregate) 806, indirect ratio forecasts (disaggregate) 808, indirect denominator forecasts (aggregate) 810, and indirect denominator forecasts (disaggregate) 812. Although both aggregate and disaggregate versions of component forecasts are shown, the indirect process for reconciliation can be applied to one, but not both, of the aggregate or disaggregate versions of each of the component forecasts.

A reconciliation process 814 can be applied to the indirect numerator forecasts (aggregate) 802 to produce a reconciled numerator forecast (aggregate) 816. The reconciliation process 814 can be applied to the indirect numerator forecasts (disaggregate) 804 to produce reconciled numerator forecast (disaggregate) 818. A reconciliation process 820 can be applied to the indirect denominator forecasts (aggregate) 810 to produce a reconciled denominator forecast (aggregate) 822. The reconciliation process 820 can be applied to the indirect denominator forecasts (disaggregate) 812 to produce reconciled denominator forecast (disaggregate) 824.

The reconciled numerator forecast (aggregate) 816 and the reconciled denominator forecast (aggregate) 822 can be used in a ratio computing process 826 to determine the reconciled ratio forecast (aggregate) 828. The reconciled numerator forecast (disaggregate) 818 and the reconciled denominator forecast (disaggregate) 824 can be used in a ratio computing process 830 to determine the reconciled ratio forecast (disaggregate) 832. For example, $\hat{y}_{i,t}^R$ and $\hat{x}_{i,t}^R$ can represent the reconciled forecasts for the numerator and denominator time series. $\hat{Y}_t^R$ and $\hat{X}_t^R$ can represent the reconciled forecasts for the aggregate numerator and aggregate denominator time series. The indirect reconciled ratio forecasts can be determined as follows: $\hat{z}_{i,t}^{IR} = \hat{y}_{i,t}^R / \hat{x}_{i,t}^R$ and $\hat{Z}_t^{IR} = \hat{Y}_t^R / \hat{X}_t^R$.

Figure 9:
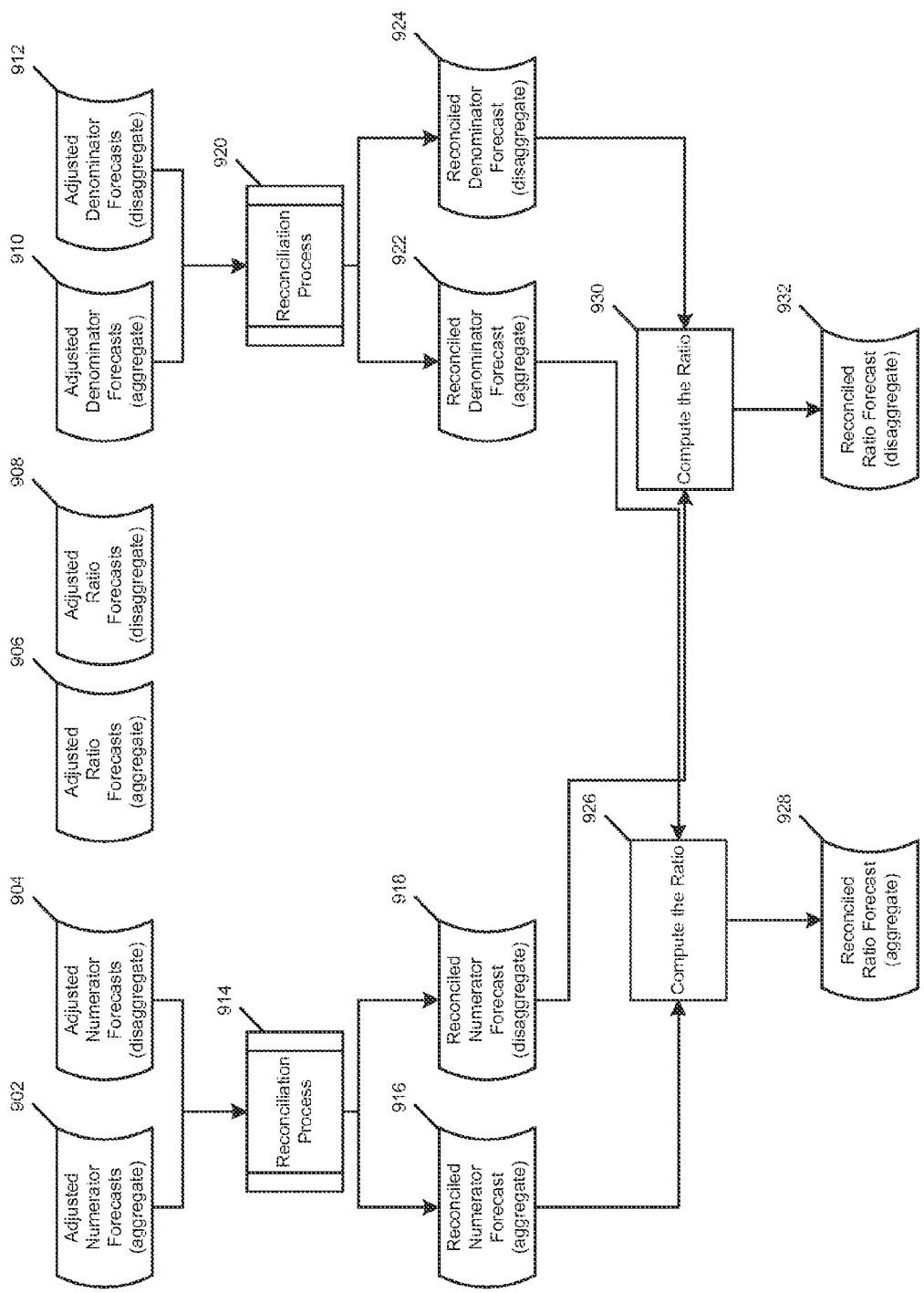
FIG. 9 shows an example of a data flow diagram that includes reconciliation using an adjusted process.

FIG. 9 is a data flow diagram depicting an example of reconciliation using an adjusted process. Included in FIG. 9 are adjusted numerator forecasts (aggregate) 902, adjusted numerator forecasts (disaggregate) 904, adjusted ratio forecasts (aggregate) 906, adjusted ratio forecasts (disaggregate) 908, adjusted denominator forecasts (aggregate) 910, and adjusted denominator forecasts (disaggregate) 912. Although both aggregate and disaggregate versions of component forecasts are shown, the adjusted process for reconciliation can be applied to one, but not both, of the aggregate or disaggregate versions of each of the component forecasts.

A reconciliation process 914 can be applied to the adjusted numerator forecasts (aggregate) 902 to produce a reconciled numerator forecast (aggregate) 916. The reconciliation process 914 can be applied to the adjusted numerator forecasts (disaggregate) 904 to produce reconciled numerator forecast (disaggregate) 918. A reconciliation process 920 can be applied to the adjusted denominator forecasts (aggregate) 910 to produce a reconciled denominator forecast (aggregate) 922. The reconciliation process 920 can be applied to the adjusted denominator forecasts (disaggregate) 912 to produce reconciled denominator forecast (disaggregate) 924.

The reconciled numerator forecast (aggregate) 916 and the reconciled denominator forecast (aggregate) 922 can be used in a ratio computing process 926 to determine the reconciled ratio forecast (aggregate) 928. The reconciled numerator forecast (disaggregate) 918 and the reconciled denominator forecast (disaggregate) 924 can be used in a ratio computing process 930 to determine the reconciled ratio forecast (disaggregate) 932. For example, $\breve{x}_{i,t}^R$ can represent the reconciled forecasts for the denominator time series appended to the actual values. $\breve{X}_t^R$ can represent the reconciled forecasts for the aggregate denominator time series appended to the actual values. $\breve{y}_{i,t}^{AR}$ can represent the reconciled forecasts for the adjusted numerator series. $\breve{Y}_t^{AR}$ can represent the reconciled forecasts for the adjusted aggregate numerator time series. The adjusted reconciled ratio forecasts can be determined using the following relationships: $\hat{z}_{i,t}^{AR} = \hat{y}_{i,t}^{AR} / \breve{x}_{i,t}^R$ and $\hat{Z}_t^{AR} = \hat{Y}_t^{AR} / \breve{X}_t^R$.

The following is an example of using certain aspects in forecasting ratios in hierarchies. A large manufacturing company is seeking to forecast the amount of cash reserves that it needs to retain for covering warranty claims on its products. This problem can involve accounting processes that are less concerned with under-allocated versus "lazy" capital (i.e., respectively: money that is not available to cover claims versus money that is tied up in reserve and not available for investment). The practical application of the problem can be focused on two areas: (1) accurate financial reporting where projected profits are impacted by over/under allocation of expected reserves, and (2) customer perceptions about the stability and quality of the product line.

Using the screening process, the problem could be formulated in forecasting the total cost of claims over time directly, which may include some adjustment for expected growth and inflation. Alternatively, the total claims or some form of a failure rate (e.g., total claims per units in the field) can be forecasted. Forecasting as a ratio can provide a form of consistency through analysis of the incremental failure rate (i.e., number of units sold that failed divided by the number of units sold in the field). This can assume some degree of stability based on classical reliability analysis that projects a parametric distribution curve based on a long-running and slowly evolving statistical quality control process.

The components of the forecast can be known. For example, the numerator can be the number of actual failures and the denominator can be the embedded base for potential failures. The denominator may be deterministic and/or controllable. For example, the company can have a planned production cycle for an extended period of time, although market demand may cause adjustments. Market pressure, planned recalls, promotional warranty offerings, length of warranty, availability of parts, and other causal factors may influence the numerator, denominator, or both. Low volatility may be expected on the denominator. Moderate volatility may be expected on the numerator that could vary based on the age of the units. The historical data streams can be robust for the numerator and denominator. The additional internal/external covariates, however, may not be accurately and consistently captured over a long period.

A hierarchical forecast can be used since the reserves may be partitioned into a geographic segment (e.g., manufacturing plant) and product line (e.g., refrigerators, washer/dryers, HVAC, etc.). The manufacturing can be assumed to be distributed equitably across plants. If the company is well-established, the customer base for the more popular product lines may be somewhat similar. An exception may be "specialty" products that are only sold to specific markets. Plant definitions can be relatively stable unless a serious economic upturn/downturn warrants either expansion or closure. In that case, some of the historical plant data may need to be reclassified hierarchically (in the case of consolidation) or re-distributed (e.g., new plants). Product lines (at a macro level) may be relatively stable (although new models may be less so).

A direct process can be applied since, for example, the incremental failure rate (IFR) is an appropriate metric, the numerator variable (i.e., number of units in the field) is somewhat deterministic and stable, the appropriate hierarchy (e.g., top line, plant, product, etc.) is stable and equitably segmented. Furthermore, an additional hierarchical level can be added that reflects the IFR for products of a certain age. For example, separate IFR's can be forecasted for one-month-old units, two-month-old, etc., with the end date based on the warranty. The expanded hierarchy can include: (top line, plant, product, age). Bottom-up reconciliation can be used if the categories contain sufficient data. Furthermore, a separate forecast for cost/claim can be perhaps, such as with an indirect process and involve a different level of forecast segmentation (hierarchy) more focused on type of claim (i.e., much more erratic and volatile). In addition, the IFR forecasts can be matched with the projected volumes and cost/claim (adjusted for inflation), thus forming a picture of the requisite reserves.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus.

The computer readable medium can be a machine readable storage device, a machine readable storage substrate, a memory device, a composition of matter effecting a machine readable propagated communication, or a combination of one or more of them. The term "data processing device" encompasses all apparatus, devices, and machines for processing data, including by way of example a programmable processor, a computer, or multiple processors or computers. The device can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code), can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and a device can also be implemented as, special purpose logic circuitry, e.g., an FPGA (field programmable gate array) or an ASIC.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) to LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any from, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a LAN and a WAN, e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specifics, these should not be construed as limitations on the scope or of what may be claimed, but rather as descriptions of features specific to particular embodiments. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims. For example, the actions recited in the claims can be performed in a different order and still achieve desirable results.

What is claimed is:

1. A computer implemented method, comprising:
   forming, on a computing device, hierarchies having components that include a numerator time series with values from input data, a denominator time series with values from the input data, and a ratio time series of the numerator time series over the denominator time series;
   modeling, with the computing device, the components to generate forecasted hierarchies; and
   reconciling the forecasted hierarchies so that the forecasted hierarchies are statistically consistent throughout nodes of the forecasted hierarchies.

2. The method of claim 1, further comprising:
   responsive to receiving an override that includes a change to at least one of the hierarchies,
   modeling the components to generate re-forecasted hierarchies; and
   re-reconciling the re-forecasted hierarchies.

3. The method of claim 1, wherein modeling the components includes modeling each component independently from each other.

4. The method of claim 1, wherein modeling the components includes modeling the numerator time series and the denominator time series jointly at a node of the hierarchies.

5. The method of claim 1, wherein modeling the components includes using a ratio model prediction directly to predict a ratio time series forecast.

6. The method of claim 5, wherein reconciling the forecasted hierarchies includes using a weight associated with each of the components.

7. The method of claim 6, wherein the weight is a time-varying weight.

8. The method of claim 7, further comprising:
   determining the weight using reconciled forecasts for the denominator time series and reconciled forecasts for an aggregate denominator time series.

9. The method of claim 1, wherein modeling the components includes determining the ratio time series forecast based on a numerator time series forecast and a denominator time series forecast.

10. The method of claim 9, wherein reconciling the forecasted hierarchies includes determining reconciled ratio forecasts using reconciled forecasts for the numerator time series and reconciled forecasts for the denominator time series.

11. The method of claim 9, wherein modeling the components includes deriving confidence bands for the forecasted hierarchies using a transformation or simulation.

12. The method of claim 1, wherein modeling the components includes:
   pre-adjusting the numerator time series by dividing the numerator time series by the denominator time series appended with denominator time series future predictions;
   modeling the pre-adjusted numerator time series to generate adjusted predictions; and
   post-adjusting the adjusted predictions by multiplying the adjusted predictions by the denominator time series appended with denominator time series future predictions.

13. The method of claim 12, wherein reconciling the forecasted hierarchies includes:
   determining reconciled ratio forecasts using reconciled forecasts for the numerator time series appended to actual values and reconciled forecasts for the denominator time series appended to actual values.

14. The method of claim 1, wherein forming the hierarchies includes:
   aggregating the numerator time series;
   aggregating the denominator time series; and
   generating an aggregated ratio of the aggregated numerator time series and the aggregated denominator time series.

15. The method of claim 14, wherein modeling the components includes using ratio model prediction directly to predict a ratio forecast for the aggregated ratio.

16. The method of claim 14, wherein modeling the components includes predicting a ratio forecast for the aggregated ratio using a forecast of the aggregated numerator time series and a forecast of the aggregated denominator time series.

17. The method of claim 14, wherein modeling the components includes:
   pre-adjusting the aggregated numerator time series by dividing the aggregated numerator time series by the aggregated denominator time series appended with future predictions;
   modeling the pre-adjusted aggregated numerator time series to generate adjusted aggregated predictions for the numerator time series; and
   post-adjusting the adjusted aggregated predictions by multiplying the adjusted aggregated predictions with the aggregated denominator time series appended with the future predictions.

18. A system, comprising:
   a server device that includes:
      a processor; and
      a non transitory computer readable storage medium containing instructions that when executed on the processor cause the processor to perform operations including:

forming hierarchies having components that include a numerator time series with values from input data, a denominator time series with values from the input data, and a ratio time series of the numerator time series over the denominator time series;

modeling the components to generate forecasted hierarchies; and reconciling the forecasted hierarchies so that the forecasted hierarchies are statistically consistent throughout nodes of the forecasted hierarchies.

19. The system of claim 18, wherein the server device includes instructions configured to cause the processor to perform operations including:

responsive to receiving an override that includes a change to at least one of the hierarchies, modeling the components to generate re-forecasted hierarchies; and re-reconciling the re-forecasted hierarchies.

20. The system of claim 18, wherein modeling the components includes modeling each component independently from each other.

21. The system of claim 18, wherein modeling the components includes modeling the numerator time series and the denominator time series jointly at a node of the hierarchies.

22. The system of claim 18, wherein modeling the components includes using a ratio model prediction directly to predict a ratio time series forecast.

23. The system of claim 22, wherein the server device includes instructions configured to cause the processor to perform operations including:

reconciling the forecasted hierarchies by using a weight associated with each of the components.

24. The system of claim 23, wherein the weight is a time-varying weight.

25. The system of claim 24, wherein the server device includes instructions configured to cause the processor to perform operations including:

determining the weight using reconciled forecasts for the denominator time series and reconciled forecasts for aggregate denominator time series.

26. The system of claim 18, wherein modeling the components includes determining the ratio time series forecast based on a numerator time series forecast and a denominator time series forecast.

27. The system of claim 26, wherein reconciling the forecasted hierarchies includes determining reconciled ratio forecasts using reconciled forecasts for the numerator time series and reconciled forecasts for the denominator time series.

28. The system of claim 26, wherein modeling the components includes deriving confidence bands for the forecasted hierarchies using a transformation or simulation.

29. The system of claim 18, wherein the server device includes instructions configured to cause the processor to perform operations using the modeling the components including:

pre-adjusting the numerator time series by dividing the numerator time series by the denominator time series appended with denominator time series future predictions;

modeling the pre-adjusted numerator time series to generate adjusted predictions; and post-adjusting the adjusted predictions by multiplying the adjusted predictions by the denominator time series appended with denominator time series future predictions.

30. The system of claim 29, wherein the server device includes instructions configured to cause the processor to perform operations including:

reconciling the forecasted hierarchies by determining reconciled ratio forecasts using reconciled forecasts for the numerator time series appended to actual values and reconciled forecasts for the denominator time series appended to actual values.

31. The system of claim 18, wherein the server device includes instructions configured to cause the processor to perform operations including forming the hierarchies by operations including:

aggregating the numerator time series;

aggregating the denominator time series; and generating an aggregated ratio of the aggregated numerator time series and the aggregated denominator time series.

32. The system of claim 31, wherein modeling the components includes using ratio model prediction directly to predict a ratio forecast for the aggregated ratio.

33. The system of claim 31, wherein modeling the components includes predicting a ratio forecast for the aggregated ratio using a forecast of the aggregated numerator time series and a forecast of the aggregated denominator time series.

34. The system of claim 31, wherein the server device includes instructions configured to cause the processor to perform operations including modeling the components with operations including:

pre-adjusting the aggregated numerator time series by dividing the aggregated numerator time series by the aggregated denominator time series appended with future predictions;

modeling the pre-adjusted aggregated numerator time series to generate adjusted aggregated predictions for the numerator time series; and post-adjusting the adjusted aggregated predictions by multiplying the adjusted aggregated predictions with the aggregated denominator time series appended with the future predictions.

35. A computer-program product tangibly embodied in a non-transitory machine readable storage medium, including instructions configured to cause a data processing apparatus to:

form hierarchies having components that include a numerator time series with values from input data, a denominator time series with values from the input data, and a ratio time series of the numerator time series over the denominator time series;

model the components to generate forecasted hierarchies; and reconcile the forecasted hierarchies so that the forecasted hierarchies are statistically consistent throughout nodes of the forecasted hierarchies.

36. The computer-program product of claim 35, further comprising instructions configured to cause the data processing apparatus to:

responsive to receiving an override that includes a change to at least one of the hierarchies, model the components to generate re-forecasted hierarchies; and re-reconcile the re-forecasted hierarchies.

37. The computer-program product of claim 35, wherein instructions configured to cause the data processing apparatus to model the components includes instructions for modeling each component independently from each other.

38. The computer-program product of claim 35, wherein instructions configured to cause the data processing apparatus to model the components includes instructions for modeling the numerator time series and the denominator time series jointly at a node of the hierarchies.

39. The computer-program product of claim 35, wherein instructions configured to cause the data processing apparatus to model the components includes instructions for using a ratio model prediction directly to predict a ratio time series forecast.

40. The computer-program product of claim 39, wherein instructions configured to cause the data processing apparatus to reconcile the forecasted hierarchies includes instructions for using a weight associated with each of the components.

41. The computer-program product of claim 40, wherein the weight is a time-varying weight.

42. The computer-program product of claim 41, further comprising instructions configured to cause the data processing apparatus to determine the weight using reconciled forecasts for the denominator time series and reconciled forecasts for aggregate denominator time series.

43. The computer-program product of claim 35, wherein instructions configured to cause the data processing apparatus to model the components includes instructions for determining the ratio time series forecast based on a numerator time series forecast and a denominator time series forecast.

44. The computer-program product of claim 43, wherein instructions configured to cause the data processing apparatus to reconcile the forecasted hierarchies includes instructions for determining reconciled ratio forecasts using reconciled forecasts for the numerator time series and reconciled forecasts for the denominator time series.

45. The computer-program product of claim 43, wherein instructions configured to cause the data processing apparatus to model the components includes instructions for deriving confidence bands for the forecasted hierarchies using a transformation or simulation.

46. The computer-program product of claim 43, wherein instructions configured to cause the data processing apparatus to model the components includes instructions for:
pre-adjusting the numerator time series by dividing the numerator time series by the denominator time series appended with denominator time series future predictions;
modeling the pre-adjusted numerator time series to generate adjusted predictions; and
post-adjusting the adjusted predictions by multiplying the adjusted predictions by the denominator time series appended with denominator time series future predictions.

47. The computer-program product of claim 46, wherein instructions configured to cause the data processing apparatus to reconcile the forecasted hierarchies includes instructions for determining reconciled ratio forecasts using reconciled forecasts for the numerator time series appended to actual values and reconciled forecasts for the denominator time series appended to actual values.

48. The computer-program product of claim 35, wherein instructions configured to cause the data processing apparatus to form the hierarchies includes instructions for:
aggregating the numerator time series;
aggregating the denominator time series; and
generating an aggregated ratio of the aggregated numerator time series and the aggregated denominator time series.

49. The computer-program product of claim 48, wherein instructions configured to cause the data processing apparatus to model the components includes instructions for using ratio model prediction directly to predict a ratio forecast for the aggregated ratio.

50. The computer-program product of claim 49, wherein instructions configured to cause the data processing apparatus to model the components includes instructions for predicting a ratio forecast for the aggregated ratio using a forecast of the aggregated numerator time series and a forecast of the aggregated denominator time series.

51. The computer-program product of claim 49, wherein instructions configured to cause the data processing apparatus to model the components includes instructions for:
pre-adjusting the aggregated numerator time series by dividing the aggregated numerator time series by the aggregated denominator time series appended with future predictions;
modeling the pre-adjusted aggregated numerator time series to generate adjusted aggregated predictions for the numerator time series; and
post-adjusting the adjusted aggregated predictions by multiplying the adjusted aggregated predictions with the aggregated denominator time series appended with the future predictions.

* * * * *

UNITED STATES PATENT AND TRADEMARK OFFICE
CERTIFICATE OF CORRECTION

| | | |
|---|---|---|
| PATENT NO. | : 9,147,218 B2 | Page 1 of 1 |
| APPLICATION NO. | : 13/786838 | |
| DATED | : September 29, 2015 | |
| INVENTOR(S) | : Michael James Leonard et al. | |

It is certified that error appears in the above-identified patent and that said Letters Patent is hereby corrected as shown below:

Title Page

In the Inventors (72), please delete

"Dunellen, NJ"

And insert

--Cary, NC--

Signed and Sealed this
Fifteenth Day of March, 2016

Michelle K. Lee
*Director of the United States Patent and Trademark Office*